(No Model.)
D. J. BARNES.
STANCHION.
No. 360,265. Patented Mar. 29, 1887.
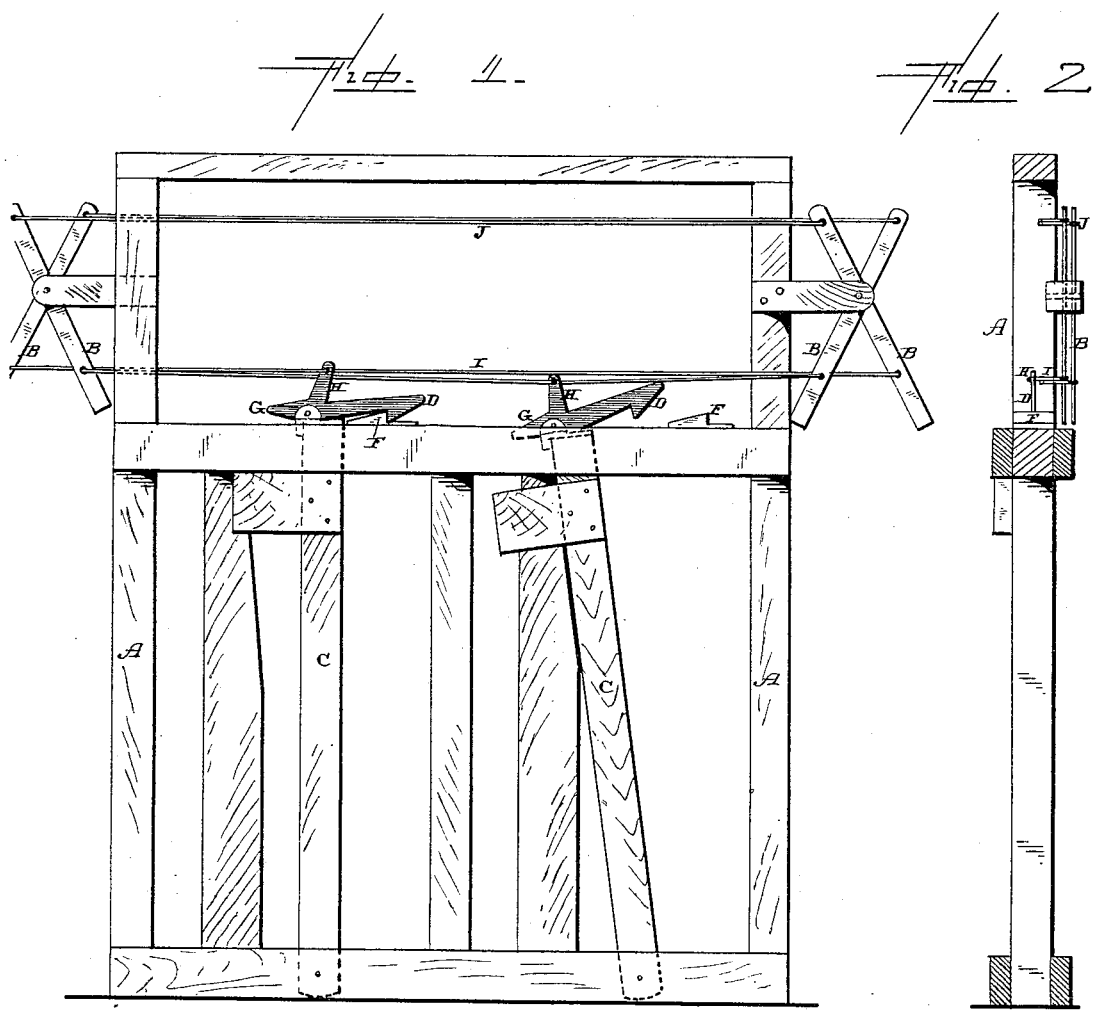

UNITED STATES PATENT OFFICE.

DAVID J. BARNES, OF FORT ATKINSON, WISCONSIN.

STANCHION.

SPECIFICATION forming part of Letters Patent No. 360,265, dated March 29, 1887.

Application filed January 26, 1887. Serial No. 225,556. (No model.)

*To all whom it may concern:*

Be it known that I, DAVID J. BARNES, of Fort Atkinson, in the county of Jefferson and State of Wisconsin, have invented certain new and useful Improvements in Stanchions; and I do hereby declare the following to be a full, clear, and exact description of the invention, such as will enable others skilled in the art to which it pertains to make and use it, reference being had to the accompanying drawings, which form part of this specification.

My invention relates to an improvement in stanchions; and it consists in the combination of the frame-work in which the stanchions are formed, suitable stationary catches formed thereon, the movable uprights of the stanchions carrying the pivoted latches upon their upper ends to engage with the catches, an operating-wire which is connected to each latch, and two levers for each latch, the levers being connected together at both of their ends, so that the movable uprights and latch can be operated from either end of the frame-work alike, as will be more fully described hereinafter.

The object of my invention is to provide the stanchions with a latch which cannot be operated by the horns of the animal, but which can be operated by a person at either end of the frame-work, each latch being connected to the upper end of the movable portion of the stanchion, whereby each stanchion can be opened and closed at a distance from the animal.

Figure 1 is a side elevation of a stanchion to which my invention is applied. Fig. 2 is a vertical cross section of the same.

A represents a suitable frame-work, in which the different stanchions are formed, and which has its end timbers made to extend any suitable distance above the tops of the stanchions for the purpose of forming supports for the operating-levers B. Mounted upon the upper end of each movable upright C of the stanchions is the pivoted latch D, which engages with the stationary catch F upon the top of the frame-work when the stanchion is closed. Projecting horizontally outward from the rear end of this latch is the stop G, which prevents the latch from being raised beyond a certain point, and extending vertically from the latch is the arm H, to which the operating-wire I is fastened. The opposite ends of the wire I are fastened to the operating-levers B, which are again united together at their upper ends by the wires J. Each pair of levers is connected both to the latch and to each other at both of their ends, so that each pair will always move alike. Each pair of levers being connected to one of the pivoted latches, and as the latches only move in connection with the movable uprights of the stanchion, it will readily be seen that by operating one of the latches the stanchion is opened or closed.

The movable uprights and latches being connected to the levers, and the levers being pivoted side by side, the operator, standing at one end of the frame, can open all of the stanchions at the same time, and then, after the animals have passed their heads through, can either close all at once or any one of them at a time.

By means of the construction here shown and described the operator is saved the time and trouble of going to each stanchion to close it separately, and he can release all the cattle by a single movement, instead of having to release them one at a time. While standing in reach of any one of the stanchions he can operate the latch by hand to open or close the movable upright, if so desired, without the lever attachment. The latch being placed upon the top of the movable upright, is entirely out of the reach of the horns of the animals, and hence they can never release themselves, as is frequently the case where the latch can be reached by throwing their horns upward.

Having thus described my invention, I claim—

1. In a stanchion, the combination of the movable upright of the stanchion, the latch pivoted upon its top and provided with an upwardly-projecting arm, the stationary catch, the operating-wire I, the levers B, pivoted upon the frame-work, and the wire J for connecting the upper ends of the levers together, substantially as shown.

2. The combination, in a series of stanchions, of the frame A, having suitable extensions at the ends to form supports for the operating-levers, the movable uprights, the pivoted latches secured to their upper ends and provided with the arms extending therefrom, and the stops, the stationary catches upon the frame-work, and the levers connected together in pairs and to the latches, substantially as set forth.

In testimony whereof I affix my signature in presence of two witnesses.

DAVID J. BARNES.

Witnesses:
S. A. CRAIG,
W. H. ROGERS.